United States Patent
Leblanc et al.

(10) Patent No.: US 10,329,157 B2
(45) Date of Patent: Jun. 25, 2019

(54) PROCESS FOR THE PREPARATION OF $SiO_x$ HAVING A NANOSCALE FILAMENT STRUCTURE AND USE THEREOF AS ANODE MATERIAL IN LITHIUM-ION BATTERIES

(71) Applicant: HYDRO-QUÉBEC, Montréal, Québec (CA)

(72) Inventors: Dominic Leblanc, Gentilly (CA); Abdelbast Guerfi, Brossard (CA); Karim Zaghib, Longueuil (CA); Pierre Hovington, Boucherville (CA); Julie Trottier, Mirabel (CA)

(73) Assignee: HYDRO-QUéBEC, Montréal, Québec (CA)

( * ) Notice: Subject to any disclaimer, the term of this patent is extended or adjusted under 35 U.S.C. 154(b) by 0 days.

(21) Appl. No.: 15/039,615

(22) PCT Filed: Nov. 28, 2014

(86) PCT No.: PCT/CA2014/051141
§ 371 (c)(1),
(2) Date: May 26, 2016

(87) PCT Pub. No.: WO2015/077892
PCT Pub. Date: Jun. 4, 2015

(65) Prior Publication Data
US 2017/0260057 A1  Sep. 14, 2017

(30) Foreign Application Priority Data

Nov. 28, 2013 (CA) .................................... 2835583

(51) Int. Cl.
*C01B 33/113* (2006.01)
*H01M 4/48* (2010.01)
(Continued)

(52) U.S. Cl.
CPC .......... *C01B 33/113* (2013.01); *C01B 33/182* (2013.01); *H01M 4/364* (2013.01);
(Continued)

(58) Field of Classification Search
CPC ..... C01B 33/113; H01M 4/587; H01M 4/483; H01M 4/386; H01M 4/364;
(Continued)

(56) References Cited

U.S. PATENT DOCUMENTS 1,104,384 A  7/1914  Potter
2,823,979 A  2/1958  Sears
(Continued)

FOREIGN PATENT DOCUMENTS

CN  1513922 A  7/2004
EP  0216649 A2  4/1987
(Continued)

OTHER PUBLICATIONS

Guo, Hong, et al. "Hollow nanotubular SiO x templated by cellulose fibers for lithium ion batteries." Electrochimica Acta 74 (2012): 271-274.*

(Continued)

*Primary Examiner* — Richard M Rump
(74) *Attorney, Agent, or Firm* — Buchanan Ingersoll & Rooney P.C.

(57) ABSTRACT

A process for the preparation of nanofilament particles of $SiO_x$ in which x is between 0.8 and 1.2, the process comprising: a step consisting of a fusion reaction between silica ($SiO_2$) and silicon (Si), at a temperature of at least about 1410° C., to produce gaseous silicon monoxide (SiO); and a step consisting of condensation of the gaseous SiO to produce the $SiO_x$ nanofilament particles. The process may also comprising using carbon.

22 Claims, 7 Drawing Sheets

(51) Int. Cl.

| | | |
|---|---|---|
| *H01M 4/36* | (2006.01) | |
| *H01M 4/38* | (2006.01) | |
| *H01M 4/587* | (2010.01) | |
| *H01M 10/0525* | (2010.01) | |
| *C01B 33/18* | (2006.01) | |
| *H01M 4/136* | (2010.01) | |
| *H01M 4/02* | (2006.01) | |

(52) U.S. Cl.
CPC ........... *H01M 4/386* (2013.01); *H01M 4/483* (2013.01); *H01M 4/587* (2013.01); *H01M 10/0525* (2013.01); *C01P 2002/72* (2013.01); *C01P 2004/01* (2013.01); *C01P 2004/16* (2013.01); *C01P 2004/50* (2013.01); *C01P 2004/61* (2013.01); *C01P 2006/40* (2013.01); *H01M 4/136* (2013.01); *H01M 2004/021* (2013.01); *H01M 2004/027* (2013.01)

(58) Field of Classification Search
CPC ....... H01M 10/0525; H01M 2004/027; H01M 2004/021; C01P 2004/16; C01P 2004/01; C01P 2002/72; C01P 2004/61; C01P 2004/50; C01P 2006/40
See application file for complete search history.

(56) References Cited

U.S. PATENT DOCUMENTS

| 5,009,703 | A | * | 4/1991 | Arvidson | ............... | C01B 33/025 |
|---|---|---|---|---|---|---|
| | | | | | | 423/350 |
| 5,096,685 | A | | 3/1992 | Funahashi et al. | | |
| 2001/0012503 | A1 | | 8/2001 | Fukuoka et al. | | |
| 2001/0018037 | A1 | | 8/2001 | Fukuoka et al. | | |
| 2012/0251710 | A1 | | 10/2012 | Jang et al. | | |
| 2014/0302395 | A1 | | 10/2014 | Fukuoka et al. | | |
| 2016/0002055 | A1 | | 1/2016 | Kim et al. | | |

FOREIGN PATENT DOCUMENTS

| EP | 1236682 | A1 | | 9/2002 | | |
|---|---|---|---|---|---|---|
| EP | 1363341 | A2 | | 11/2003 | | |
| GB | 2279942 | A | * | 1/1995 | ........... | C01B 33/113 |
| JP | S62-27318 | A | | 2/1987 | | |
| JP | 2002154819 | A | | 5/2002 | | |
| JP | 2005225691 | A | | 8/2005 | | |
| JP | 2005231957 | A | | 9/2005 | | |
| JP | 2013171628 | A | | 9/2013 | | |
| JP | 2013180935 | A | * | 9/2013 | | |
| KR | 10 1290659 | B1 | | 8/2012 | | |
| KR | 20120089073 | A | | 8/2012 | | |
| KR | 101290659 | B1 | * | 7/2013 | | |
| WO | 03/068868 | A2 | | 8/2003 | | |
| WO | 2013054476 | A1 | | 4/2013 | | |
| WO | 2014126272 | A1 | | 8/2014 | | |

OTHER PUBLICATIONS

Wang, Jigang, et al. "Synthesis, characterization, and photoluminescence properties of bulk-quantity β-SiC/SiOx coaxial nanowires." Materials Chemistry and Physics 135.2-3 (2012): 1005-1011.*
Chan, C. K. et al."High-performance lithium battery anodes using silicon nanowires" Letters, Nano, vol. 3, Jan. 2008, pp. 31-35.
Guerfi, A. et al."SiO,-graphite as negative for high energy Li-ion batteries" Journal of Power Sources, vol. 196, 2011, pp. 5667-5673.
Kasavajjula, U. et al."Nano- and bulk-silicon-based insertion anodes for lithium-ion secondary cells" Journal of Power Sources, vol. 163, 2007, pp. 1003-1039.
Klein H. et al."Production, Properties and Application of Silicon Monoxide" pp. 141-145.
Lamontagne, P. et al."Synthesis of silicon nanowires from carbothermic reduction of silica fume in RF thermal plasma" Phys. Status Solidi A, vol. 211, No. 7, pp. 1610-1616, 2014.
Morita, T. et al."Nano Si Cluster-SiOx—C Composite Material as High-Capacity Anode Material for Rechargeable Lithium Batteries" Journal of the Electrochemical Society, vol. 153, No. 2, pp. A425-A430, 2006.
Office Action (Text of the Notice of the First Office Action) dated Apr. 26, 2017, by the State Intellectual Property Office of the People's Republic of China in corresponding Chinese Patent Application No. 201480064293.8, and an English Translation of the Office Action. (16 pages).
Office Action (Notification of the Third Office Action) dated Nov. 2, 2018, by the State Intellectual Property Office of the People's Republic of China in corresponding Chinese Patent Application No. 201480064293.8 and an English Translation of the Office Action, 26 pages.
Jung C. et al,"Synthesis of SiOx Powder Using DC Arc Plasma" Journal of Nanoscience and Nanotechnology,vol. 13, No. 2, pp. 1153-1158, 2013.
Komarov S. V. et al.,"Formation of SiO ano Related Si-Based Materials Through Carbothermic Reduction of Silica-Containing Slag" Materials Transactions, vol. 46, No. 4, pp. 827 to 834, 2005. XP-002768706.
Pei L. Z.,"Silicon oxide nanowires and spheres grown by hydrothermal deposition" Materials Science—Poland, vol. 27, No. 1, pp. 339-347, 2009. XP-008183921.
Partial Extended European Search Report dated Apr. 20, 2017, issued by the European Patent Office in corresponding European Application No. 14865311.6-1375 (8 pages).
Extended European Search Report dated Aug. 2, 2017, issued by the European Patent Office in corresponding European Application No. 14865311.6-1375 (18 pages).
Office Action (Notice of Reasons for Refusal) dated Dec. 13, 2018, by the Japanese Patent Office in corresponding Japanese Patent Application No. 2016-528819, and an English Translation of the Office Action. (12 pages).

* cited by examiner

FIGURE 1

(Prior Art)

PROCESS FOR THE PREPARATION OF SiO$_x$ HAVING A NANOSCALE FILAMENT STRUCTURE AND USE THEREOF AS ANODE MATERIAL IN LITHIUM-ION BATTERIES

CROSS REFERENCE TO RELATED APPLICATIONS

This application claims benefit of Canadian application CA 2,835,583 filed on Nov. 28, 2013.

FIELD OF THE INVENTION

The present invention relates generally to anode materials for lithium-ion (Li-ion) batteries. More specifically, the present invention relates to a process for the preparation of SiO$_x$ having a nanoscale filament structure and its use as anode material in lithium-ion batteries.

BACKGROUND OF THE INVENTION

Ever since the beginning of work in the field of lithium-ion batteries by the Sony company during the early nineties, this type of batteries has been widely used, leading to a commercial success. Typically, the technology is based on the use of lithium insertion materials as electrode material. Specifically, cobalt oxide is used as cathode material (invented by J. B. Goodenough) and carbon-based materials (coke or graphitized carbon) are used as anode material.

Since then, lithium-ion batteries have progressively replaced Ni—Cd and Ni-MH batteries. Indeed in many electronic applications, lithium-ion batteries perform better than Ni—Cd and Ni-MH batteries. However, because the production cost of lithium-ion batteries is high and because their intrinsic stability is generally compromised under harsh conditions, only small format lithium-ion batteries have been successfully commercialized.

Today the technology is based mostly on the use of anode materials containing graphite. However, it appears that the use of such carbon-based anode imposes a 372 mAh/g limit for the specific energy capacity, with no possibility of further increase.

The use of metallic lithium as anode material has been investigated. Indeed, metallic lithium presents a high energy density and may lead to a high specific energy capacity. However, security issues are associated to the use of metallic lithium. This is due to the growth of dendrites during use. Moreover, a limit on the lifetime after many charge/discharge cycles has been noted. These disadvantages have caused researchers to look for other solutions. For example, the use of silicon (Si), tin (Sn) and their alloys as potential high capacity anode materials has been investigated.

Indeed regarding silicon, this metal allows for a reversible insertion and de-insertion of lithium ions through a reaction between silicon and lithium, $5Si+22Li \rightarrow Si_5Li_{22}$, which corresponds to a theoretical capacity of 4200 mAh/g. This capacity is significantly higher than the capacity for carbon-based materials. However, silicon-based anodes are unstable during cycling due to the high volume expansion of silicon (up to about 320%).

Reducing the particle size of a silicon-based anode material (use of nanoscale particles for example) leads to better cycling performance. Indeed, the use of nanoscale particles allows for the relaxation of internal mechanical constraints associated with the large volume increase [1]. A technique consists of using a material which has a nanoscale filament structure. Indeed, such structure can accommodate the deformations in the radial direction of fibers, thus avoiding pulverization of silicon and loss of electric contacts [1,2].

Another technique for decreasing the volume expansion consists of preparing an intimate mixture of silicon and an inert component that can accommodate the deformation. For example, a fine dispersion of silicon in an inactive matrix which relaxes mechanical constraints and insures electric continuity has been prepared [1,3]. Such compromise may be achieved by using a mixture of Si/SiO$_2$, at the expense of a partial loss of silicon capacity. In this regard, the use of silicon monoxide (SiO$_x$, with x≈1) that has been annealed, allows for a dismutation reaction, $2SiO \rightarrow SiO_2+Si$. The amorphous phase of SiO$_x$ outside the reaction equilibrium precipitates silicon in an amorphous SiO$_2$ matrix, which leads to a material having a theoretical capacity of 1338 mAh/g [4].

The first synthesis of SiO$_x$ was performed by Potter in 1907 [5]. Potter noted that at temperatures higher than 1000° C., a rapid reaction between silicon (Si) and silicon oxide (SiO$_2$) occurs. He further noted that if the reaction occurs under inert atmosphere, the reaction product appears as a brown, light, very fine and voluminous powder.

SiO$_x$ is currently commercially available. It is produced at a moderately high temperature (about 1250° C.), under vacuum, according to the following reaction [6]:

An equimolar mixture of SiO$_2$ powder and Si powder in a tube is heated, under vacuum, until a temperature of 1250° C. is reached. Gaseous SiO formed is directed to an area of the tube that is colder and is condensed. The tube is cooled, re-pressurized, and solid SiO$_x$ is recuperated. The solid SiO$_x$ is then submitted to a grinding process until the desired granulometry is reached.

Figure 1:
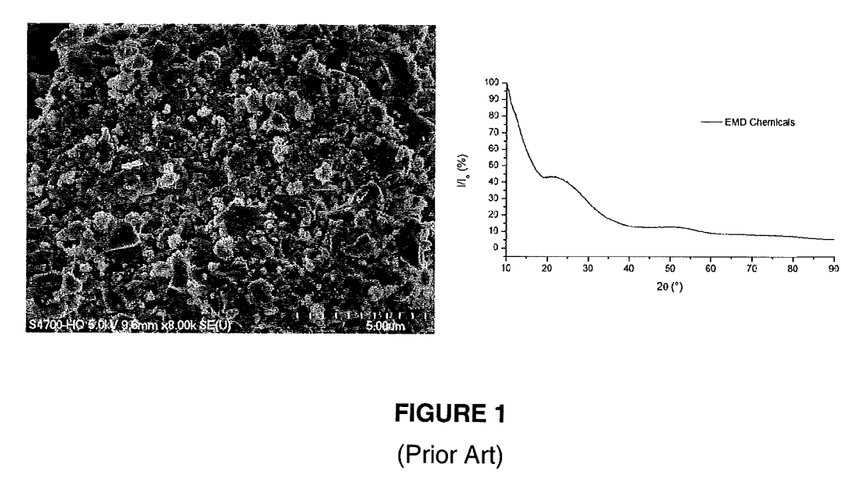
FIG. 1 shows a typical aspect of a commercially available SiO material; micrograph taken by an electronic microscope and X-ray diffraction analysis.

The relatively low temperature of the process, about 1250° C., allows for the use of a vacuum tube made in stainless steel (retort furnace). However in return, the partial pressure of gaseous SiO in the tube is maintained at a very low level, which greatly affects the productivity of the process. A micrograph taken by a scanning electron microscope shows a typical aspect of the material (FIG. 1) through its X-ray diffraction analysis. The X-ray diffraction analysis shows the amorphous nature of the material. Indeed, no diffraction pic is observed. This is typical to amorphous SiO that has been cooled rapidly and that has not undergone any dismutation reaction.

It is known that annealing such material at a temperature higher than 900° C., under inert atmosphere, does activate the dismutation reaction of SiO, which leads to the precipitation of a very fine silicon phase in an amorphous silicon matrix [3]:

Indeed, Takami et al. [3] prepared a composite of Si, SiO$_x$ and C by dismutation of silicon monoxide and polymerization of furfurylic acid at 1000° C. They reported a reversible capacity of about 700 mAh/g for 200 cycles.

There is still a need for materials having a high energy capacity; advantageously, the capacity is reversible for a high number of cycles. Accordingly, there is also a need for processes for preparing these materials; advantageously, the process is efficient and cost-effective.

A material having a high energy capacity can be a nanometric dispersion of crystalline Si in an amorphous $SiO_2$ matrix. Lamontagne et al. disclose a process for the preparation of such material. The process uses $SiO_2$ fume; also the process involves uses of various catalysts [7].

Encouraged by the result obtained by Takami et al. relative to a composite of Si, $SiO_x$ and C [3], our research group took up a more close investigation of the use of $SiO_x$ as electrode material in Li-ion batteries. We have studied, respectively, the use of $SiO_x$ and $SiO_x$ mixed with graphite as anode material in lithium-ion batteries [4]. Despite the fact that the coulombic efficiency of the first charge/discharge cycle and the electronic conductivity of $SiO_x$ are low, the theoretical specific capacity of $SiO_x$ electrodes is good, 1338 mAh/g. We have considered the addition of graphite to $SiO_x$.

SUMMARY OF THE INVENTION

The inventors have designed and performed a process for the preparation of a $SiO_x$ material having a nanoscale filament structure (nanofilaments, nano-structured particles). The process of the invention comprises a high temperature fusion reaction between $SiO_2$ and Si which leads to the formation of gaseous SiO, and a condensation reaction of silicon monoxide fume under normal (standard) or reduced pressure. According to a preferred embodiment, the process comprises use of carbon. The material of the invention allows for the fabrication of high performance anodes for lithium-ion batteries.

According to an aspect, the invention relates to:

(1) Process for the preparation of nanofilament particles of $SiO_x$ in which x is between 0.8 and 1.2, the process comprising:
- a step consisting of a fusion reaction between silica ($SiO_2$) and silicon (Si), at a temperature of at least about 1410° C., to produce gaseous silicon monoxide (SiO); and
- a step consisting of condensation of the gaseous SiO to produce the $SiO_x$ nanofilament particles.

(2) Process for the preparation of nanofilament particles of $SiO_x$ in which x is between 0.8 and 1.2, the process comprising:
- a step consisting of a fusion reaction between silica ($SiO_2$), silicon (Si) and a source of carbon (C), at a temperature of at least about 1410° C., to produce gaseous silicon monoxide (SiO); and
- a step consisting of condensation of the gaseous SiO to produce the $SiO_x$ nanofilament particles.

(3) Process according to item (1) or (2), wherein the $SiO_2$ is in solid form and the Si is in liquid form.

(4) Process according to item (1) or (2), wherein the fusion step is performed in an induction furnace, an electric arc furnace or a submerged arc furnace.

(5) Process according to item (1) or (2), wherein the condensation step is performed in a low temperature area of a furnace, the gaseous SiO being moved to the low temperature area by a vector gas.

(6) Process according to item (6), wherein the vector gas is an inert gas, preferably Ar, He, $N_2$; an oxidant gas, preferably air, $H_2O$, $O_2$, $CO_2$; a reduction gas, preferably CO, $H_2$; a volatile hydrocarbon; or a combination thereof.

(7) Process according to item (1) or (2), wherein the fusion step is performed under vacuum.

(8) Process according to item (1) or (2), wherein the fusion step is performed under inert atmosphere.

(9) Process according to item (8), wherein the inert atmosphere consists of Ar, He or $N_2$.

(10) Process according to item (1) or (2), wherein the temperature at the fusion step is between about 1450 and about 1700° C., preferably about 1500° C.

(11) Process according to item (2), wherein the source of carbon consists of graphite, charcoal, petroleum coke, charcoal, wood or a combination thereof.

(12) Process for the preparation of nanofilament particles of $SiO_x$ in which x is between 0.8 and 1.2, the process comprising the following steps:
- liquid silicon (Si) is introduced in a furnace and the temperature is brought to at least about 1410° C.;
- solid silica ($SiO_2$) is introduced in the furnace while agitating the mixture and gaseous silicon monoxide (SiO) is produced; and
- the gaseous SiO is moved to a low temperature area of the furnace using a vector gas, and condensed to yield the $SiO_x$ nanofilament particles.

(13) Process for the preparation of nanofilament particles of $SiO_x$ in which x is between 0.8 and 1.2, the process comprising the following steps:
- solid silica ($SiO_2$) and a source of carbon are introduced in a furnace and the temperature is brought to at least about 1410° C., and metallic silicon (Si) and gaseous silicon monoxide (SiO) are produced; and
- the gaseous SiO is moved to a low temperature area of the furnace using a vector gas, and condensed to yield the $SiO_x$ nanofilament particles.

(14) Process according to item (12), wherein the furnace is an induction furnace, an electric arc furnace or a submerged arc furnace.

(15) Process according to item (12), wherein the furnace is an induction furnace, and the agitation stems from a magnetic field produced by the furnace.

(16) Process according to item (12), wherein the step of introducing the silica in the furnace is accompanied by a purge process during which oxygen present is eliminated.

(17) Process according to item (13), wherein the furnace is a submerged arc furnace.

(18) Process according to item (13), wherein the source of carbon consists of graphite, charcoal, petroleum coke, charcoal, wood or a combination thereof.

(19) Process according to item (12) or (13), wherein the step of producing gaseous SiO is performed under vacuum.

(20) Process according to item (12) or (13), wherein the step of producing gaseous SiO is performed under inert atmosphere.

(21) Process according to item (20), wherein the inert atmosphere consists of Ar, He or $N_2$.

(22) Process according to item (12) or (13), wherein the temperature is between about 1450 and about 1700° C., preferably about 1500° C.

(23) Process according to item (12) or (13), wherein the vector gas is an inert gas, preferably Ar, He, $N_2$; an oxidant gas, preferably air, $H_2O$, $O_2$, $CO_2$; a reduction gas, preferably CO, $H_2$; a volatile hydrocarbon; or a combination thereof.

(24) Process according to any one of items (1) to (23), wherein x is about 1.

(25) Process according to any one of items (1) to (24), wherein $SiO_2$ is in a form which is quartz, quartzite or a combination thereof.

(26) Process according to any one of items (1) to (25), wherein the $SiO_x$ particles are in spherical agglomerates consisting of nanofilaments, each agglomerate having a diameter of about 2 to 10 µm.

(27) Process according to any one of items (1) to (26), wherein the nanofilaments each has a diameter of about 50 nm, and the agglomerates are linked together by spheres each having a diameter of about 100 to 150 nm.

(28) Process according to any one of items (1) to (27), wherein the nanofilament $SiO_x$ particles obtained comprise at least one of: amorphous $SiO_2$, crystalline Si and SiC, preferably SiC is in β form.

(29) Nanofilament particles of $SiO_x$ obtained by the process as defined in any one of items (1) to (28).

(30) Material comprising nanofilament particles of $SiO_x$ obtained by the process as defined in any one of items (1) to (28).

(31) Use of nanofilament particles of $SiO_x$ obtained by the process as defined in any one of items (1) to (28), in the fabrication of an anode material.

(32) Anode comprising nanofilament particles of $SiO_x$ obtained by the process as defined in any one of items (1) to (28).

(33) Anode comprising a material as defined in item (30).

(34) Battery comprising an anode as defined in item (32) or (33).

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention relates to a process for the preparation of a $SiO_x$ material, wherein x is between about 0.8 to about 1.2; preferably x is about 1. The $SiO_x$ material according to the invention has a nanoscale filament structure (nanofilaments, nano-structured particles).

The process of the invention comprises the synthesis of $SiO_x$ particles from condensation of gaseous SiO obtained by a high temperature metallurgic process as outlined below.

A step comprising a fusion reaction between Si(l) and $SiO_2$(l,s) to produce SiO(g) is performed, under controlled atmosphere. For example, fusion in an induction furnace, a plasma furnace, an electric arc furnace or a submerged arc furnace. The fusion reaction proceeds according to the following reaction:

Thereafter, a gas or mixture of gases is used as vector to move SiO(g) in a cold area for the condensation. Nucleation and growth of solid $SiO_x$ nano-structured particles occur during condensation.

Figure 2:
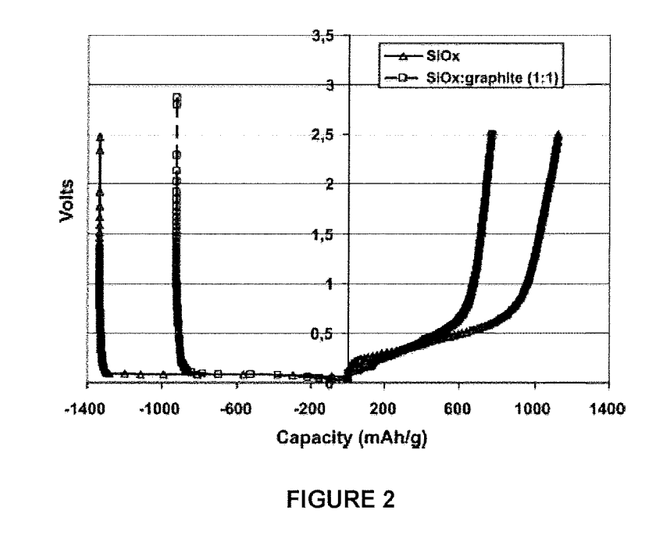
FIG. 2 shows the capacity of the anode when commercially available $SiO_x$ is used, and when a mixture of $SiO_x$ and graphite is used.

According to an aspect, the fusion step may be replaced by a step of carbothermic reduction of $SiO_2$ as illustrated by the reaction below. Various source of carbon may be used; for example graphite (FIG. 2), coal, petroleum coke, charcoal, wood or a combination thereof. Silica may be, for example, in a form which is quartz, quartzite or a combination thereof.

The gas mixture used as vector to move gaseous SiO may comprise inert gases (for example Ar, He, $N_2$), oxidant gases (for example air, $H_2O$, $O_2$, $CO_2$), reducing gases (for example CO, $H_2$, volatiles hydrocarbons) or a combination thereof.

EXAMPLES

The following examples are provided solely as illustrative embodiments and should not be interpreted, in any way, as limiting the invention.

Example 1

Figure 3:
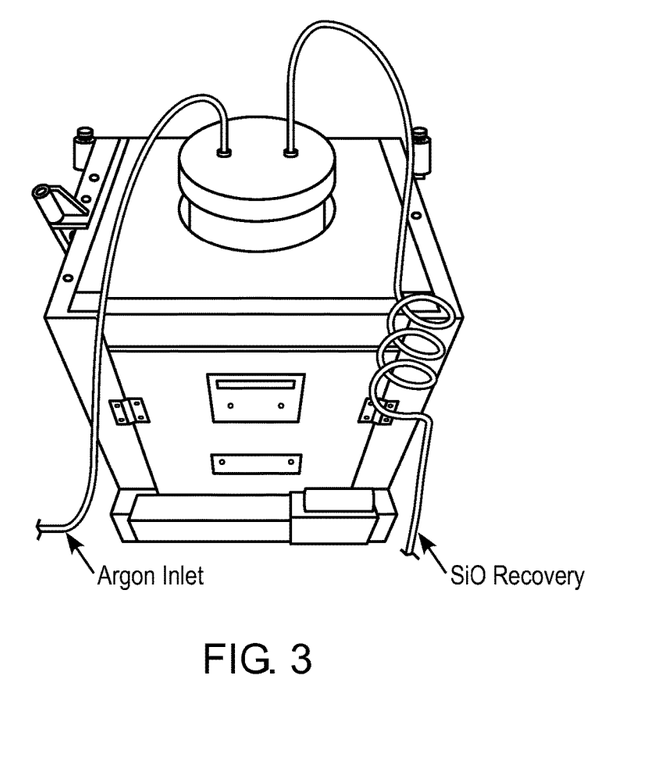
FIG. 3 shows an induction furnace equipped with a graphite crucible.

Metallurgical grade silicon (Si) is melted in an induction furnace equipped with a graphite crucible. The experiment system also comprises a cover for the crucible, a feeding port for feeding argon as vector gas, and a capacitor (FIG. 3).

Liquid silicon is heated to 1500° C. Silica ($SiO_2$) is added, at the liquid (Si) surface. The crucible cover is then put in place and the process of feeding argon begins. The induction furnace produces a magnetic field which causes the liquid to rotate, leading to $SiO_2$(s) being dispersed within Si(l). Once oxygen initially present in the system is completely purged, the side reaction producing silica fume stops (2SiO(g)+$O_2$(g)→2$SiO_2$(s)) and the reaction producing $SiO_x$ particles begins (SiO(g)→SiO(am)). The color of the product changes from white (silica fume, $SiO_2$) to brown ($SiO_x$).

Figure 4:
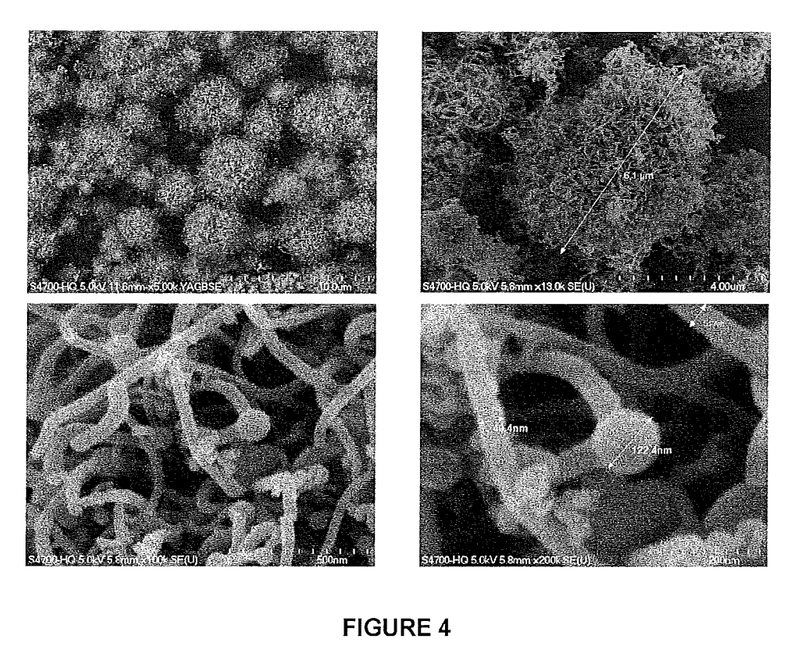
FIG. 4 shows nanofilaments of $SiO_x$ obtained by the process of the invention.

The material obtained is examined using a scanning electron microscope (SEM) under high magnification. $SiO_x$ obtained presents spherical agglomerates having diameters of 2 to 10 µm and a nanoscale fibrous structure. The nanofilaments have a diameter of about 50 nm and are joined together by spheres having diameters of about 100 to 150 nm (FIG. 4).

Figure 5:
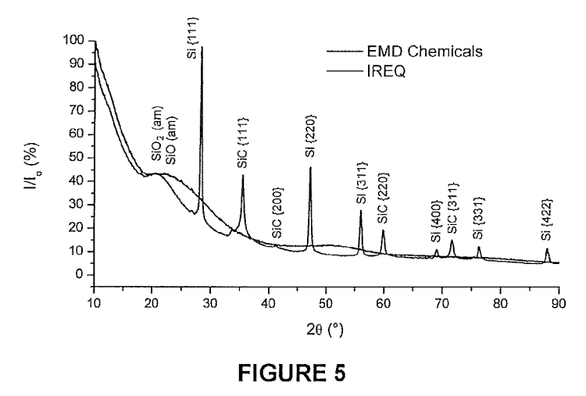
FIG. 5 shows the X-ray diffraction analysis of nanofilament particles of $SiO_x$ obtained by the process of the invention.

According to the X-ray diffraction analysis (FIG. 5), the particles comprise amorphous silica ($SiO_2$), crystalline silicon (Si) and silicon carbide (SiC) (β form). $SiO_x$ has thus undergone a dismutation reaction leading to a nanometric dispersion of crystalline Si in an amorphous $SiO_2$ matrix.

The total amount of oxygen, measured by LECO, shows a similar level of oxygen for commercially available $SiO_x$ and for $SiO_x$ obtained in Example 1.

Example 2

Metallic silicon is prepared, using a submerged arc furnace, by carbothermic reduction of quartz ($SiO_2$) with reducing materials such as mineral coal, charcoal or coke petroleum. During the reaction, about 80% of silicon is reduced according to the following global reaction:

$$SiO_2 + 2C \xrightarrow{>1800°C} Si(l) + 2CO(g)$$

An intermediate reaction occurs, which is the production of gaseous SiO in the hottest area of the furnace (the arc), according to the following reaction:

$$SiO_2 + C \rightarrow SiO(g) + CO(g)$$

In order to allow for retrieval of a sample of $SiO_x$, a modification was made to the arc furnace, which consists of creating a longitudinal opening in one of the graphite electrodes. Gaseous SiO leaving the reaction area was sucked through the opening. Gaseous SiO flowing through the electrode condenses once it reaches a colder area, in absence of oxygen, according to the following reaction:

$$SiO(g) \rightarrow SiO(am) \rightarrow Si(cr) + SiO_2(am)$$

$SiO_x$ obtained is fibrous, as in the first synthesis, and presents the same diffractogram as the one obtained for the sample in Example 1: an amount of SiO undergoes dismutation leading to metallic silicon and amorphous quartz; moreover, the carbon-rich atmosphere leads to the production of traces of silicon carbide (SiC).

Example 3

Figure 6:
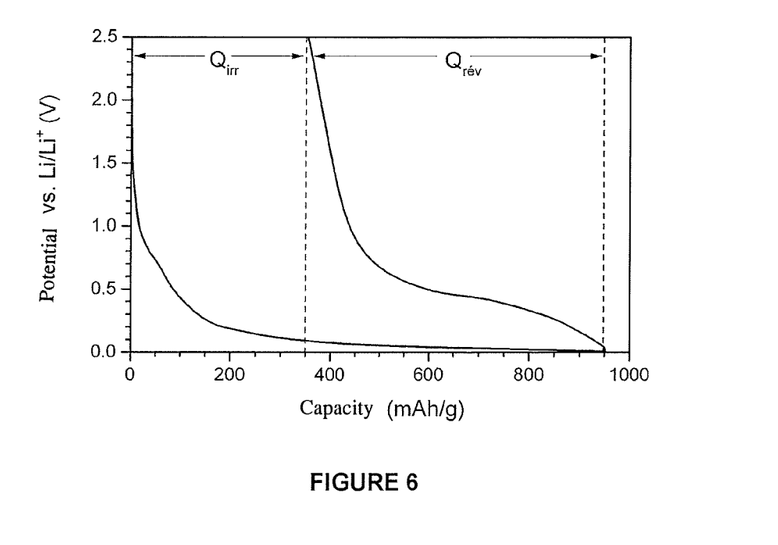
FIG. 6 shows results of cycling formation (electrochemical tests).
Figure 7:
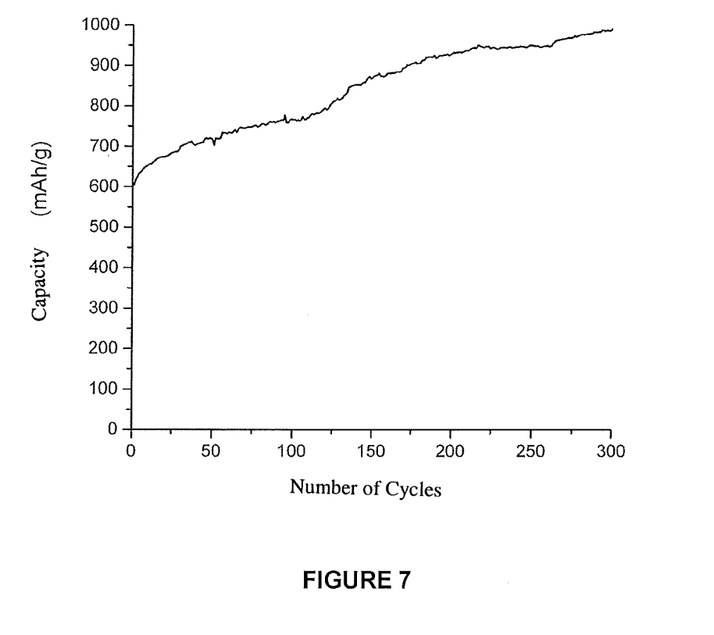
FIG. 7 shows results of cycling stability (electrochemical tests).

A composite electrode is fabricated by mixing the active material ($SiO_x$) with 25% wt of carbon black (Denka black) and 25% wt of binder (sodium alginate, Aldrich) in a solvent consisting of deionized water to obtain a homogenous dispersion, which is then deposited on a current collector made of copper. The electrode is dried for 20 hours under vacuum at 110° C. A button cell of CR2032 format is assembled in a glovebox full of helium. The electrolyte used is $LiPF_6$ (1M) in a 3:7 (v/v) mixture of ethylene carbonate (EC) and diethyl carbonate (DEC) with 2% wt vinylene carbonate (VC) (Ube). The counter electrode is a thin film of lithium. The electrochemical tests on the battery are performed by discharge/charge cycling in galvanostatic mode within a potential of 0.005 to 2.5 V at a C/24 speed (FIG. 6). Once the reversible capacity is measured, cycling of the battery is performed in order to measure its stability at a C/6 speed (FIG. 7).

Although the present invention is described by way of specific embodiments thereof, it is to be understood that various variations and modifications may be linked to these embodiments. The present inventions covers such modifications, uses or adaptations of the invention in general, the principles of the invention including any variation which will become known or conventional in the field of the invention, and which may apply to essential elements indicated above in accordance with the scope of the claims.

The scope of the claims should not be limited by the preferred embodiments set forth in the examples, but should be given the broadest interpretation consistent with the description as a whole.

REFERENCES

[1] Uday Kasavajjula, Chunsheng Wang, A. John Appleby; Nano- and bulk-silicon-based insertion anodes for lithium-ion secondary cells, *Journal of Power Sources* 163 (2007) 1003-1039.

[2] Candace K. Chan, Hailin Peng, Gao Liu, Kevin McIlwrath, Xiao Feng Zhang, Robert A. Huggins and Yi Cui; High-performance lithium battery anodes using silicon nanowires, *Nature Nanotechnology*, vol. 3, January 2008, pp. 31-35.

[3] T. Morita, N. Takami, Nano Si Cluster-SiO—C Composite Material as High-Capacity Anode Material for Rechargeable Lithium, *Journal of the Electrochemical Society,* 153 (2) A425-A430 (2006).

[4] A. Guerfi, P. Charest, M. Dontigny, J. Trottier, M. Lagacé, P. Hovington, A. Vijh, K. Zaghib; $SiO_x$-graphite as negative for high energy Li-ion batteries, *Journal of Power Sources*, Volume 196, Issue 13, 1 Jul. 2011, pages 5667-5673.

[5] U.S. Pat. No. 1,104,384.

[6] H.-D. Klein, F. König, Production, Properties and Application of Silicon Monoxide, in: R. Corriu, P. Jutzi (Eds.), Tailor-made silicon-oxygen compounds-from molecules to materials, Vieweg, Braunschweig, Weiesbaden, 1996, pp. 141-145.

[7] P. Lamontagne, G. Soucy, J. Veilleux, F. Quesnel, P. Hovington, W. Zhu and K. Zaghib; Synthesis of silicon nanowires from carbothermic reduction of silica fume in RF thermal plasma; *Phys. Status Solidi A,* 1-7 (2014).

The invention claimed is:

1. A process for the preparation of nanofilament particles of $SiO_x$ in which x is between 0.8 and 1.2, the process comprising:

a step comprising a fusion reaction between silica ($SiO_2$), liquid silicon (Si) and, a source of carbon, at a temperature of at least about 1410° C., to produce gaseous silicon monoxide (SiO); and a step comprising condensation of the gaseous SiO to produce the $SiO_x$ nanofilament particles, wherein the condensation step is performed in a low temperature area of a furnace, the gaseous SiO being moved to the low temperature area by a vector gas.

2. The process according to claim 1, wherein the $SiO_2$ is in solid form.

3. The process according to claim 1, wherein the fusion step is performed in an induction furnace, an electric arc furnace or a submerged arc furnace.

4. The process according to claim 1, wherein the vector gas is selected from the group consisting of inert gas, oxidant gas, reduction gas, volatile hydrocarbon and combinations thereof.

5. The process according to claim 1, wherein the fusion step is performed under vacuum.

6. The process according to claim 1, wherein the fusion step is performed under inert atmosphere which is of Ar, He or $N_2$.

7. The process according to claim 1, wherein the temperature at the fusion step is between about 1450 and about 1700° C.

8. The process according to claim 1, wherein the source of carbon is selected from the group consisting of graphite, charcoal, petroleum coke, charcoal, wood and combinations thereof.

9. The process according to claim 1, wherein x is about 1.

10. The process according to claim 1, wherein the $SiO_2$ is in a form which is quartz, quartzite or a combination thereof.

11. The process according to claim 1, wherein the $SiO_x$ particles are in spherical agglomerates consisting of nanofilaments, each agglomerate having a diameter of about 2 to 10 µm.

12. The process according to claim 11, wherein the nanofilaments each have a diameter of about 50 nm, and the spherical agglomerates are linked together by spheres each having a diameter of about 100 to 150 nm.

13. The process according to claim 1, wherein the nanofilament $SiO_x$ particles obtained comprise at least one of: amorphous $SiO_2$, crystalline Si and SiC.

14. A process for the preparation of nanofilament particles of $SiO_x$ in which x is between 0.8 and 1.2, the process comprising the following steps:
   introducing liquid silicon (Si) in a furnace and bringing the temperature to at least about 1410° C.;
   introducing solid silica ($SiO_2$) in the furnace while agitating the mixture and producing gaseous silicon monoxide (SiO); and
   moving the gaseous SiO to a low temperature area of the furnace using a vector gas, and condensing to yield the $SiO_x$ nanofilament particles.

15. The process according to claim 14, wherein the furnace is an induction furnace, and the agitation stems from a magnetic field produced by the furnace.

16. The process according to claim 14, wherein the step of introducing the solid silica in the furnace is accompanied by a purge process during which oxygen present is eliminated.

17. A process for the preparation of nanofilament particles of $SiO_x$ in which x is between 0.8 and 1.2, the process comprising the following steps:
   introducing solid silica ($SiO_2$) and a source of carbon in the furnace and bringing the temperature-to at least about 1410° C., and producing metallic silicon (Si) and gaseous silicon monoxide (SiO); and
   moving the gaseous SiO to a low temperature area of the furnace using a vector gas, and condensing to yield the $SiO_x$ nanofilament particles, wherein the furnace is a submerged arc furnace.

18. Nanofilament particles of $SiO_x$ obtained by the process as defined in claim 1.

19. A material comprising nanofilament particles of $SiO_x$ in which x is between 0.8 and 1.2 obtained by a process comprising:
   a step comprising a fusion reaction between silica ($SiO_2$), liquid silicon (Si), and, a source of carbon (C), at a temperature of at least about 1410° C., to produce gaseous silicon monoxide (SiO); and
   a step comprising condensation of the gaseous SiO to produce the $SiO_x$ nanofilament particles, wherein the condensation step is performed in a low temperature area of a furnace, the gaseous SiO being moved to the low temperature area by a vector gas.

20. A method comprising fabricating an anode with nanofilament particles of $SiO_x$ obtained by the process as defined in claim 1.

21. An anode comprising the material as defined in claim 19.

22. A battery comprising the anode as defined in claim 21.

* * * * *